United States Patent
Connors, Sr. et al.

(10) Patent No.: US 6,460,377 B1
(45) Date of Patent: Oct. 8, 2002

(54) METHOD AND APPARATUS FOR TESTING DUAL-STAGE BLOWHEADS

(75) Inventors: Donald J. Connors, Sr., Temperance, MI (US); Earl E. Robinson, Tyrone, GA (US); Richard W. Craig, Toledo, OH (US)

(73) Assignee: Owens-Brockway Glass Container Inc., Toledo, OH (US)

(*) Notice: Subject to any disclaimer, the term of this patent is extended or adjusted under 35 U.S.C. 154(b) by 0 days.

(21) Appl. No.: 09/466,515

(22) Filed: Dec. 17, 1999

(51) Int. Cl.[7] .............................................. G01M 19/00
(52) U.S. Cl. ........................................ 65/158; 73/865.9
(58) Field of Search ................................ 65/29.15, 158; 73/37, 714, 865.9

(56) References Cited

U.S. PATENT DOCUMENTS

| | | |
|---|---|---|
| 2,123,145 | 7/1938 | Peiler |
| 2,198,750 | 4/1940 | Winder |
| 2,442,315 | 5/1948 | Samuelson et al. |
| 2,627,702 | 2/1953 | Lowe |
| 3,403,016 | 9/1968 | Smith |
| 3,871,856 | 3/1975 | Trahan |
| 3,946,595 | 3/1976 | Carlson |
| 4,453,964 | 6/1984 | Parkell |
| 4,509,969 | 4/1985 | Abbott |
| 4,615,722 | 10/1986 | Steffan et al. |
| 4,654,066 | 3/1987 | Garcia |
| 4,678,494 | 7/1987 | Nebelung et al. |
| 4,726,833 | 2/1988 | Foster |
| 4,838,921 | 6/1989 | Trahan |
| 5,106,546 | * 4/1992 | Saatkamp et al. |
| 5,139,559 | 8/1992 | Kozora |
| 5,324,339 | 6/1994 | Kozora |
| 5,537,856 | 7/1996 | Kelbrick et al. |

OTHER PUBLICATIONS

Emhart, "The Powers Dynamic Blowhead Balancing Device" (Dec. 1983).

* cited by examiner

*Primary Examiner*—Sean Vincent

(57) ABSTRACT

Apparatus for testing air flow through a dual-stage blowhead that includes an adapter block with a blowhead cup for releasably receiving a dual-stage blowhead. The adapter block has a first block passage for feeding test air to a first inlet of the blowhead for conducting blow air to a parison, and a second block passage for feeding test air to a second inlet of the blowhead separate from the first inlet for conducting finish cooling air. Air is directed from a common source separately to the first and second block passages, and air flow is measured in each path. When air flow through the finish cooling air path is less than a predetermined threshold, or less than a predetermined ratio with respect to the final blow air, this may indicate a need to redrill or otherwise rework the finish cooling passages in the dual-stage blowhead.

7 Claims, 3 Drawing Sheets

METHOD AND APPARATUS FOR TESTING DUAL-STAGE BLOWHEADS

The present invention is directed to manufacture of glassware, and more particularly to a method and apparatus for testing so-called dual-stage blowheads used in the final-blow operation of a glassware manufacturing machine. A second aspect of the invention relates to use of this method and apparatus for testing plunger coolers used in an initial parison-forming operation of a glassware manufacturing machine.

BACKGROUND AND OBJECTS OF THE INVENTION

Glassware, such as glass bottles, is typically made in a so-called individual section machine, which includes a plurality of identical sections that operate out of phase with each other to produce glassware. Each section includes one or more blank molds, in which gobs of molten glass are either pressed or blown to form parisons. Each parison is then removed from the blank mold and placed in a final-blow mold. A blowhead is lowered over the parison in the blow mold, and final-blow air is directed into the parison through the blowhead to form the parison against the internal surface of the final-blow mold.

Conventional blowheads include an air passage for feeding final blow air from an inlet to the inside of the parison. One or more second passages branch from the first passage for feeding air around the outside of the finish of the container in the blow mold to cool the finish and support the finish against outward expansion during the blowing operation. It is desirable to test such blowheads for obstruction of the final blow air passage, or obstruction of one or more of the finish air cooling passages, and apparatus has been proposed for this purpose. In such apparatus, test air is fed through a pressure regulator and a flow meter to the single inlet of the blowhead, and air pressure and flow are monitored. Reduced air flow may indicate obstruction of one or more of the air passages, potentially calling for redrilling of the air passages or replacement of the blowhead.

Blowheads of the described character have the drawback that the ratio of final blow air to finish cooling air is determined by the ratio of the diameters of the air passages in the blowhead, as well as other fixed factors. Since the finish cooling air passages branch from the final air passage within the blowhead, it is not possible to vary the ratio of finish cooling air to final blow air. It has therefore been proposed to provide a so-called dual-stage blowhead, also sometimes called an isolated finish cooled blowhead, in which the finish cooling air passages are separate from the final blow air passage and are provided with a separate inlet on the blowhead. Thus, the ratio of final blow air to finish cooling air can be controlled and varied by feeding air at different flow rates and pressures to the final blow and finish cooling inlets of the blowhead. However, a limitation on use of such dual-stage blowheads lies in the fact that such blowheads cannot be tested employing the conventional blowhead test apparatus described above.

Individual section machines are conventionally provided as either blow-and-blow machines or press-and-blow machines. In blow-and-blow machines, a blowing operation is employed to form the parisons within the blank molds. In press-and-blow machines, a plunger is employed in association with each blank mold to form the parison by pressing the molten glass gob against the confines of the blank mold. Because of the high temperature associated with the molten glass in the blank mold, the plungers are conventionally internally cooled by feeding air through a plunger cooler against the internal surface of the plunger. Plunger coolers take many conventional forms, and generally comprise a hollow needle or cone with a multiplicity of openings for directing air under pressure against the internal surface of the plunger. Blockage of air holes in the plunger cooler can result in hot spots on the plunger and manufacture of unsatisfactory glassware. Furthermore, it is desirable for all plunger coolers and all plungers of each machine section, and of the entire IS machine, to possess the same operating characteristics for optimum uniform glassware manufacture. A second aspect of the present invention relates to testing of plunger coolers to determine whether the plunger cooler openings must be reworked or redrilled.

It is therefore a general object of the present invention to provide a method and apparatus for testing air flow capability of dual-stage blowheads that are clean in operation, that provide accurate and consistent results, and that indicate when redrill or rework is necessary to remove obstructions from the air passages, particularly the finish air cooling passages. Another object of the present invention is to provide a method and apparatus of the described character that can be readily modified for testing plunger coolers.

SUMMARY OF THE INVENTION

Apparatus for testing air flow through dual-stage blowhead in accordance with a presently preferred embodiment of the invention includes an adapter block with facility for releasably receiving a dual-stage blowhead. The block has a first block passage for feeding test air to a first inlet of the blowhead for conducting blow air to a parison, and a second block passage for feeding test air to a second inlet of the blowhead separate from the first inlet for conducting finish cooling air. Air is directed from an air source separately to the first and second block passages, and air flow is measured in each path. When air flow through the finish cooling air path is less than a predetermined threshold, or less than a predetermined ratio with respect to the final blow air, this may indicate a need to redrill or otherwise rework the finish cooling passages in the dual-stage blowhead.

A blowhead cup is replaceably mounted on the apparatus adapter block in the preferred embodiment of the invention for removably receiving the blowhead, and for providing air paths separately to the final blow and finish cooling air passages of the blowhead. The blowhead may be mounted to the blowhead cup by bayonet mounting means, or by any other conventional blowhead mounting technique. In the preferred embodiment of the invention, air pressure and mass air flow are measured separately for the final blow air and the finish cooling air fed to the blowhead under test. A test container is inserted into the blowhead for simulating back pressure of air at the blowhead passages during operation for blowing a container.

In accordance with a second aspect of the invention, one of the air flow passages, preferably the air flow passage for finish cooling air, is provided with a fitting and a removable plug. When it is desired to test a plunger cooler, the plug is removed and the plunger cooler is threaded into the fitting. The final blow air path is blocked, and air is fed to the plunger cooler, while pressure and mass air flow are monitored. Air flow less than a preselected level to the plunger cooler may indicate a need to redrill or otherwise rework the cooling air passages in the plunger cooler.

There are therefore provided by the invention a method and apparatus for testing air flow operability of dual-stage blowheads, and additionally plunger coolers in the preferred embodiment of the invention. The invention thus provides facility not only for testing absolute air flow capability of dual-stage blowheads and plunger coolers, but also the capability of matching air flow capabilities of the blowheads and plunger coolers in each section of an individual section machine. This, in turn, provides improved consistency of glassware produced.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
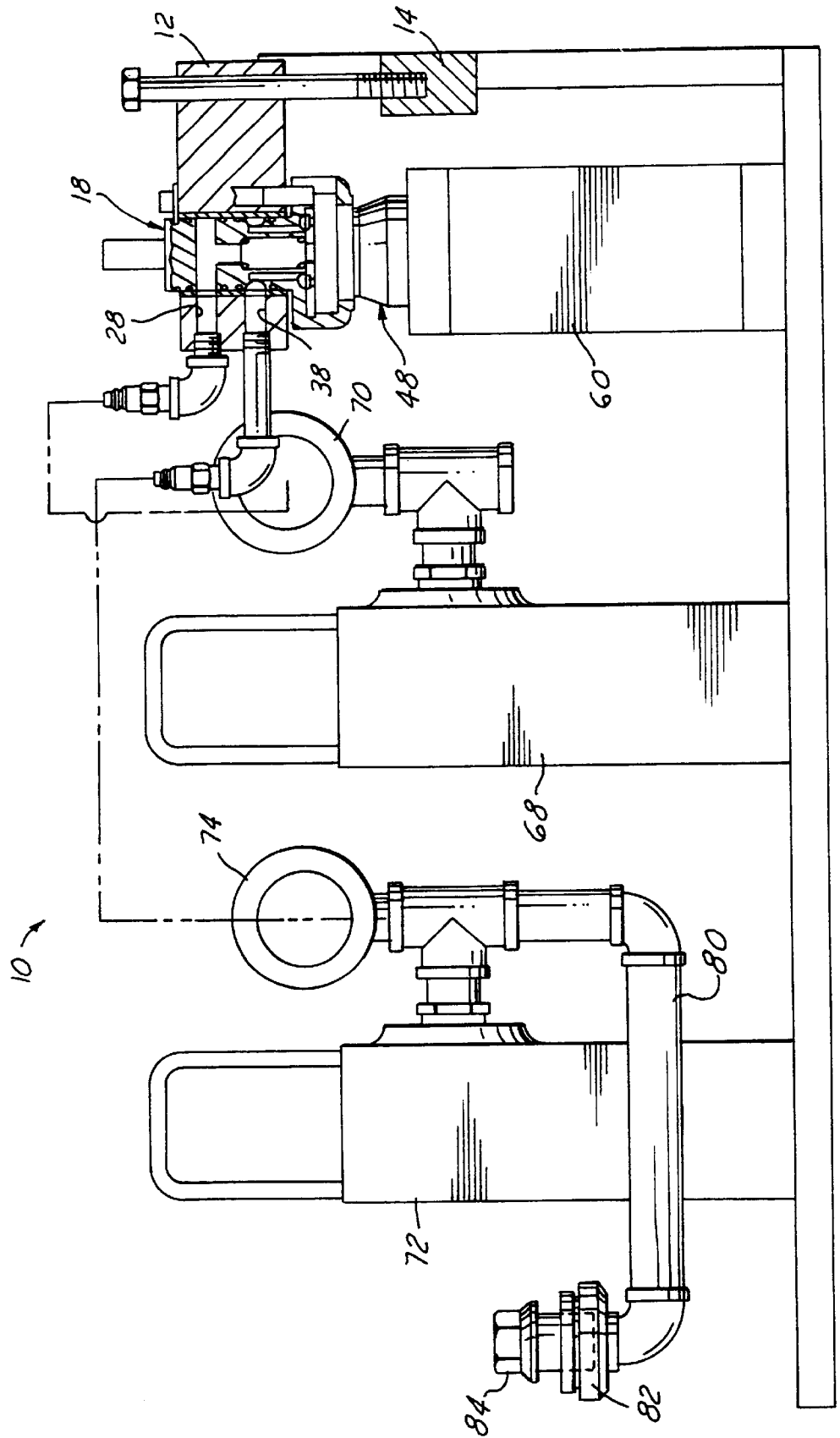
FIG. 1 is an elevational view of apparatus for testing air flow capabilities of dual-stage blowheads and plunger coolers in accordance with a presently preferred embodiment of the invention.
Figure 2:
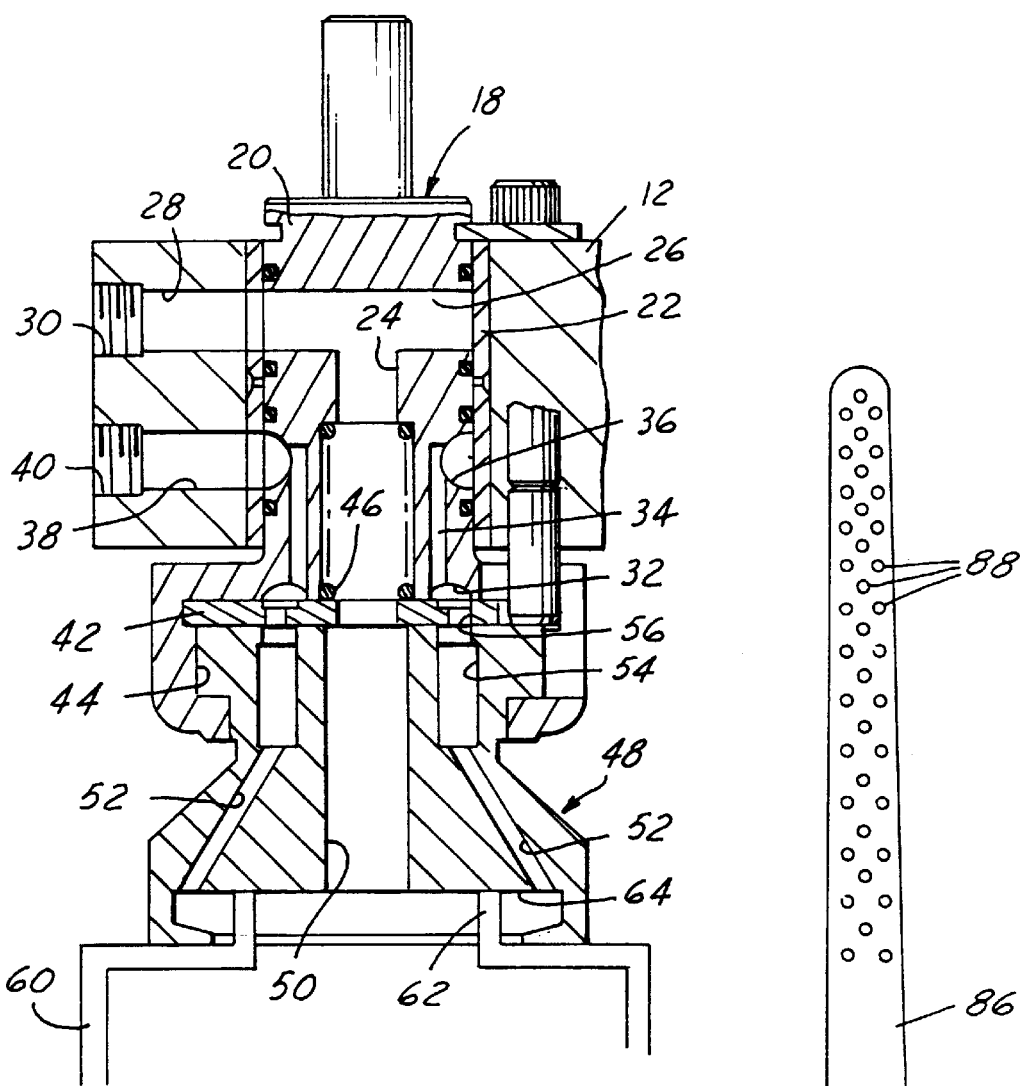
FIG. 2 is a fragmentary sectional view on an enlarged scale of the blowhead mounting cup and adapter block in the apparatus of FIG. 1.
Figure 3:
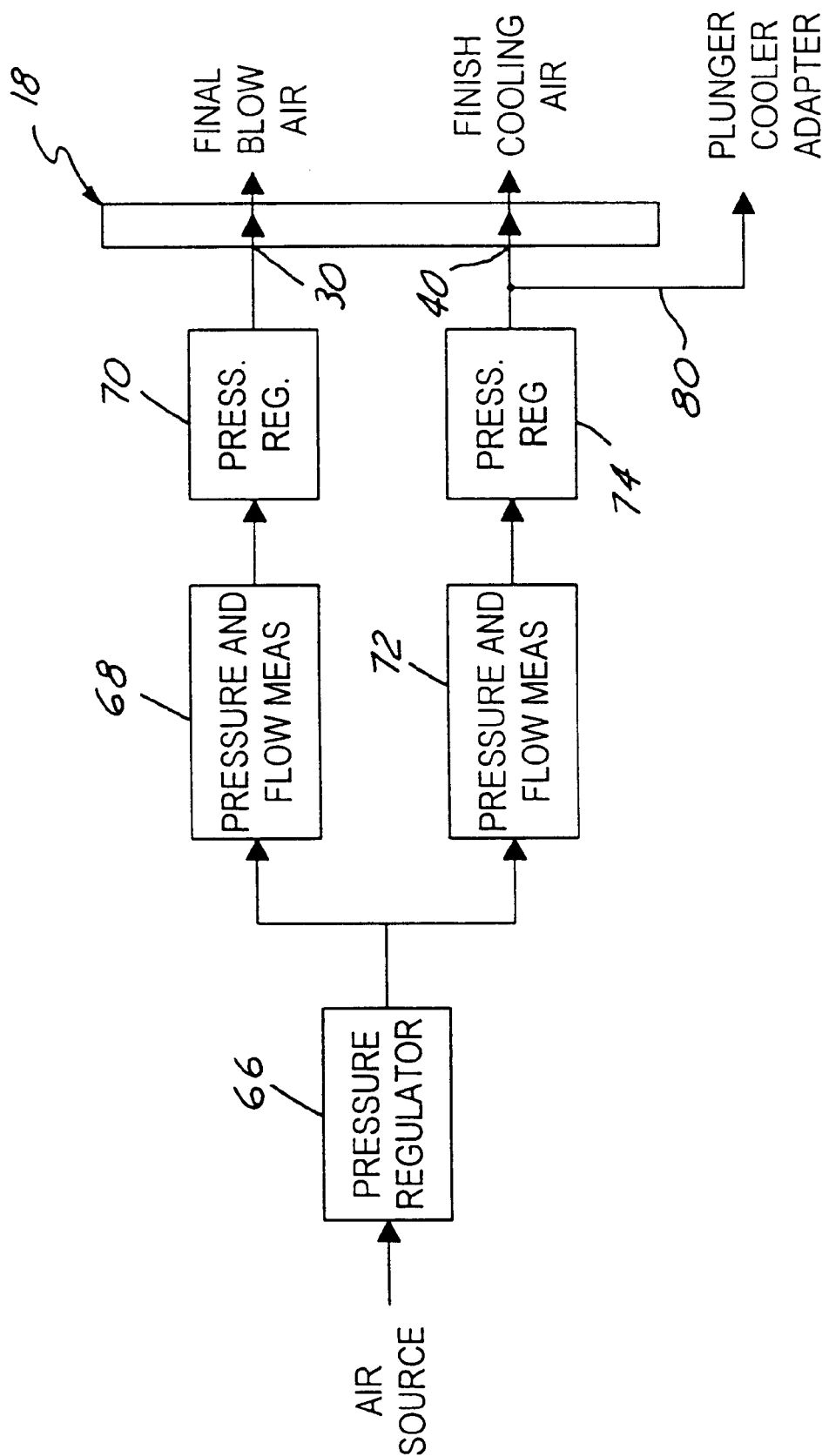
FIG. 3 is a functional block diagram of the apparatus illustrated in FIG. 1.

FIGS. 1–3 illustrate an apparatus 10 for testing dual-stage blowheads, sometimes also referred to as isolated finish cooled blowheads, in accordance with a presently preferred embodiment of the invention. An adapter block 12 is mounted on a stand 14 carried by a base plate 16. A blowhead mounting cup 18 is removably mounted on adapter block 16. Cup 18 includes a holder 20 that is slidably mounted within a bearing 22 carried by block 12. Holder 20 has a center passage 24 that opens to a lateral passage 26, and thence through a passage 28 in block 12 to an inlet port 30. An annular channel 32 is formed on the flat lower face of holder 20, and is connected by a plurality of axial passages 34 to a radial channel 36 that opens to a second lateral passage 38 in block 12. Passage 38 terminates at an inlet port 40. A wear plate 42 is carried within a downwardly opening pocket 44 at the lower end of holder 18, and is urged downwardly by a coil spring 46 captured in compression within passage 24 between holder 20 and wear plate 42.

FIGS. 1 and 2 illustrate a dual-stage blowhead 48 having a central passage 50 for final blow air, and at least two peripheral angulated passages 52 for finish cooling air. Central passage 50 is coaxial with blowhead 48, while passages 52 are offset from the central axis of the blowhead and preferably diametrically disposed with respect to each other. Passages 52 open to an annular inlet 54 at the upper axial face of blowhead 48 concentrically surrounding final blow air passage 50, and communicates through openings 56 in wear plate 44 with channel 32 in holder 20. Thus, final blow air is fed from inlet port 30 through passages 28, 26 and 24 to final blow passage 50 of blowhead 48, while finish cooling air is fed from inlet 40 through passages 38, 36, 34, channel 32, passages 56 and inlet 54 to finish air cooling passages 52 of blowhead 48. A device 60 for simulating a container has an axial neck or "finish" inserted into the open lower end of blowhead 40 against the lower surface 64 of blowhead 48 radially between final blow air passage 50 and finish cooling air passages 52. Thus, device 60 simulates a container during the final-blow operation in terms of creating back pressure on air fed through passages 50, 52.

FIGS. 1 and 2 illustrate a blowhead 48 and an associated blowhead mounting cup 18 in which the blowhead is mounted to the blowhead mounting cup by means of a conventional, 23 releasable bayonet-type mounting arrangement. It will be appreciated that FIGS. 1–2 illustrate a single configuration of cup 18 and a single configuration of blowhead 48. Other configurations are conventionally employed. Indeed, facility for replaceable mounting of cup 18 in block 12 readily accommodates dual-stage blowheads of other configurations.

Referring to FIGS. 1 and 3, apparatus 10 further comprises a pressure regulator 66 for connection to a common source of test air. Air is fed from pressure regulator 66 through apparatus 68 for measuring air pressure and mass air flow, and thence through a pressure regulator 70 to final blow air inlet 30 of adapter block 18. Likewise, air from pressure regulator 66 is fed through apparatus 72 for measuring air pressure and mass air flow, and thence through a pressure regulator 74 to finish cooling air inlet 40 of adapter block 18. Both apparatus 68, 72 are carried by base plate 16, and regulators 70, 74 are mounted on apparatus 68, 72 respectively. In operation, a blowhead 48 is mounted in cup 18, a container-simulating device 60 is inserted into the blowhead, and apparatus 10 is connected to a source of test air. Regulators 70, 74 are adjusted by an operator for controlling pressure of air fed to the final blow and finish cooling air inlets of the adapter block. Mass air flow and air pressure are then observed by an operator, and are compared to desired levels. These levels maybe determined empirically as absolute minimum desired air flow to a blowhead, or may be determined by comparing blowheads to each other for a single individual machine section. In this way, quantity of air flow maybe determined not only as an absolute measure, but also relative to other blowheads in a single machine section for optimum balance of operation. If a test blowhead does not exhibit desired air flow, this may indicate a need to rework or redrill the air flow passages in the blowhead. Alternatively, the blowhead may be simply replaced.

Figure 4:
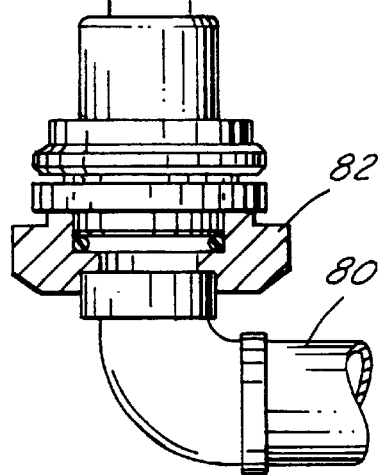
FIG. 4 is a fragmentary elevational view of an adaptation or modification of the apparatus of FIG. 1 for testing plunger coolers.

In accordance with another aspect of the invention, a conduit branch 80 extends from pressure regulator 74 in the finish cooling test air path. Conduit 80 terminates in a plunger head adapter 82, which is internally threaded to receive the external threads on the base of a plunger cooler. During operation to test a dual-stage blowhead, a plug 84 is threaded into head 82 effectively to block air flow through conduit 80. When it is desired to test a plunger cooler 86 (FIG. 4), plug 84 is removed from head 82, a plunger cooler 86 is threaded into adapter 82, and air flow to adapter block inlet ports 30, 40 is blocked (by means not shown). Air is thus fed under pressure through pressure and flow measurement apparatus 72 and pressure regulator 74 to plunger cooler 86 (FIG. 4), and flows out of the plunger cooler to the atmosphere through the multiplicity of air apertures 88 in the plunger cooler. The amount of air flow can be compared to an absolute level, determined either mathematically or empirically, or to other plunger coolers 86 from the same machine section, or to both. Low air flow may indicate a need to redrill or otherwise rework passages 88 in plunger cooler 86, or a need to provide a new plunger cooler.

There have thus been provided an apparatus and method for testing dual-stage blowheads, and also for testing plunger coolers in the preferred embodiment of the invention, that fully satisfy all of the objects and aims previously set forth. Several alternatives and modifications have been disclosed, and other alternatives and modifications will readily suggest themselves to persons of ordinary skill in the art in view of the foregoing discussion. The present invention is intended to embrace all such alternatives and modifications as fall within the spirit and broad scope of the appended claims.

What is claimed is:

1. Apparatus for testing air flow through a dual stage blowhead having first blowhead passage means including a first inlet for conducting blow air to a parison and second blowhead passage means including a second inlet separate from said first inlet for conducting finish cooling air, said apparatus comprising:

an adapter block with means for releasably receiving the blowhead, said adapter block having first block passage means for feeding test air to said first inlet and said first blowhead passage means, and second block passage means for feeding test air to said second inlet and said second blowhead passage means, first means for feeding test air from a source of test air to said first block passage means, and second means for feeding test air from the same said source of test air to said second block passage means, said first and second means including means for measuring air flow to said first and second block passage means respectively, said second means further including means for releasably connecting a plunger cooler to said second means for testing air flow through the plunger cooler.

2. The apparatus set forth in claim 1 wherein said adapter block includes a blowhead cup for releasably receiving an end of a dual stage blowhead.

3. The apparatus set forth in claim 2 wherein said blowhead cup includes a holder secured to said block, a wear plate for engaging a blowhead mounted in said cup and a coil spring captured in compression between said holder and said wear plate, said first block passage means and said second block passage means extending through said block, said holder and said wear plate.

4. The apparatus set forth in claim 1 wherein said means for measuring air flow to said first and second block passage means comprises means for measuring air pressure and mass air flow through said first and second block passage means separately from each other.

5. The apparatus set forth in claim 4 further comprising first and second pressure regulators for regulating pressure of air flow through said first and second block passage means respectively.

6. The apparatus set forth in claim 4 further comprising a test container for insertion into the blowhead for simulating back pressure of air at said first and second blowhead passage means.

7. The apparatus set forth in claim 1 wherein means for releasably connecting a plunger cooler comprises a plunger head in said second means between said means for measuring air flow and said adapter block, and a plug removably received in said plunger head, said plug being removable for securing a plunger cooler to said plunger head.

* * * * *